United States Patent [19]

Okita et al.

[11] 4,428,974

[45] Jan. 31, 1984

[54] PROCESS FOR PRODUCING MAGNETIC RECORDING MATERIAL

[75] Inventors: Tsutomu Okita; Kyoichi Naruo, both of Fujinomiya; Akira Ushimaru, Odawara, all of Japan

[73] Assignee: Fuji Photo Film Co., Ltd., Kanagawa, Japan

[21] Appl. No.: 447,597

[22] Filed: Dec. 7, 1982

[30] Foreign Application Priority Data

Dec. 7, 1981 [JP] Japan .................................. 56-195575

[51] Int. Cl.$^3$ .............................................. B05D 3/06
[52] U.S. Cl. ..................................... 427/44; 427/128; 427/130; 427/131
[58] Field of Search .................. 427/44, 54.1, 128, 130, 427/131

[56] References Cited

U.S. PATENT DOCUMENTS 3,216,846 11/1965 Hendricx et al. .................... 427/130
4,343,831 8/1982 Tsuji et al. ........................... 427/138

FOREIGN PATENT DOCUMENTS 57-130229 8/1982 Japan .................................. 427/130

Primary Examiner—John H. Newsome
Attorney, Agent, or Firm—Sughrue, Mion, Zinn, Macpeak and Seas

[57] ABSTRACT

A process for producing a magnetic recording material having excellent electromagnetic characteristics and sufficient abrasion resistance is disclosed. The process comprises the steps of coating on a support a magnetic recording composition containing a compound having an unsaturated bond polymerizable by irradiation with electron beams, an organic solvent capable of dissolving the compound and a ferromagnetic powder. The compound is subjected in sequence to a coating process on a nonmagnetic support, irradiated with an electron beam in an atmosphere containing oxygen at a concentration of 10,000 ppm or more and subjected to a smoothening treatment utilizing a specular surface, followed by an electron beam irradiation in an atmosphere containing oxygen at a concentration of 3,000 ppm or less.

10 Claims, No Drawings

PROCESS FOR PRODUCING MAGNETIC RECORDING MATERIAL

FIELD OF THE INVENTION

This invention relates to a process for producing a magnetic recording material and, more particularly, to a process for producing a magnetic recording material having excellent electromagnetic characteristics and good abrasion resistance.

BACKGROUND OF THE INVENTION

In most magnetic recording materials presently used, thermoplastic resins, such as vinyl chloride-vinyl acetate copolymer resins, vinyl chloride-vinylidene chloride copolymer resins, cellulose resins, acetal resins, urethane resins, acrylonitrile-butadiene resins and the like are used as binders independently or in combination of two or more thereof. However, these materials suffer from the defect that when used for a magnetic tape they are removed and contaminate the running passage of the magnetic tape such as guide posts, magnetic heads, cylinders, etc., due to inferior abrasion resistances of their magnetic layers.

In addition to the above materials, thermosetting resins such as melamine resins, urea resins and the like, or cross-linkable binders obtained by adding cross-linking agents such as isocyanate compounds, epoxy compounds and the like have also been used as binders for magnetic tapes. However, use of cross-linkable binders cause two serious disadvantages that (1) a resinous solution in which a magnetic substance has been dispersed has a poor storage stability, that is, a short pot life and, therefore the homogeneity of the physical properties of the magnetic coating composition cannot be maintained which, in turn, deteriorates the uniformity of the magnetic tape, and (2) after coating and drying the magnetic coating composition, the coated composition must be subjected to heat treatment for hardening the coated layer whereby the process requires a prolonged time to obtain the final magnetic recording materials.

With the intention of obviating the above-described disadvantages, methods of producing magnetic materials in which mixtures of the olygomers and the monomers of acrylic acid ester type are employed as binders and their magnetic layers are hardened by irradiation with electron beams subsequent to the drying step are disclosed in Japanese Patent Publication No. 12423/72, Japanese Patent Application (OPI) Nos. 15104/72 (French Patent No. 2,120,184 and German Patent No. 2,100,037), 77433/75 and 25235/81 (the term "OPI" as used herein refers to a "published unexamined Japanese patent application") and U.S. Pat. Nos. 3,104,983 and 4,004,997. However, such methods cannot provide magnetic recording materials having both high electromagnetic characteristics and excellent abrasion resistance.

In recent years, a demand for magnetic recording materials having high electric characteristics has increased. For this purpose, the magnetic layers must have smooth surfaces to minimize drop out, that is to say, it causes a drop in output, and contributes to the generation of noise. For this reason, magnetic recording materials having smooth magnetic layer surfaces have been required. To this end, the magnetic recording materials are generally subjected to a smoothening treatment after the drying step of the coated layer. However, the methods disclosed in the above Japanese Patent Publication No. 12423/72, and Japanese Patent Application (OPI) Nos. 15104/72 and 77433/75, in which the smoothening treatment is carried out after the hardening treatment by means of irradiation with electron beams, cannot provide sufficient smoothness to the surface. Therefore, these methods cause great noise so far as electromagnetic characteristics are concerned. In addition, the method disclosed in Japanese Patent Publication No. 25235/81 which comprises effecting a preliminary irradiation after coating and drying a magnetic layer, a smoothening treatment and a hardening treatment by irradiation with electron beams, suffers from the disadvantage that a proper dose of the preliminary irradiation must be selected depending upon the kind of binder used and control of the optimum conditions for the preliminary hardening treatment is not easy. Further, the above conventional methods are also undesirable because they do not provide a satisfactory abrasion resistance to a magnetic layer. One reason for this inferior abrasion resistance is presumed to be microscopic destruction caused in the hardened binder of the magnetic layer by the smoothening treatment.

As a result of extensive studies for improving these conventional methods, i.e., the method of using a thermoplastic resin or a thermosetting resin, the method of adding a binder which undergoes cross-linking through a certain chemical reaction, the method of using a binder which can be hardened by cross-linking by irradiation with electron beams, etc., the present inventors completed the present invention.

SUMMARY OF THE INVENTION

A first object of this invention is to provide a process for producing a magnetic tape having excellent electromagnetic characteristics.

A second object of this invention is to provide a process for producing a magnetic tape having a magnetic layer having excellent mechanical properties.

A third object of this invention is to provide a process for producing a uniform magnetic tape prepared from a magnetic coating composition having good storage stability.

A fourth object of this invention is to provide a process for producing a magnetic tape having excellent abrasion resistance.

A fifth object of this invention is to provide a process for producing a magnetic tape which does not require any heat treatments for hardening its coated magnetic layer.

The above-described objects of this invention can be attained by a process comprising the steps of:

coating on a support a composition containing a compound having an unsaturated bond polymerizable by irradiation with electron beams, an organic solvent for dissolving said compound, and a ferromagnetic powder, irradiating the coated composition with electron beams in an atmosphere containing oxygen at a concentration of at least 10,000 ppm, subjecting the surface of the coated composition to a smoothening treatment using a specular surface, and irradiating the smoothened surface with electron beams in an atmosphere containing oxygen at a concentration of 3,000 ppm or less.

That is, in the process of this invention, smoothness of a magnetic layer surface provided by the smoothening treatment is surprisingly improved by first irradiating the magnetic layer with electron beams in an atmosphere containing oxygen at a concentration of at least 10,000 ppm, preferably 50,000 ppm or more. Further, excellent electromagnetic characteristics and good abrasion resistance are provided to the magnetic recording material by subsequent irradiation with electron beams under an atmosphere containing oxygen at a concentration of 3,000 ppm or less, preferably 1,000 ppm or less, and more preferably 500 ppm or less. It appears that these effects result from the phenomenon that a binder in the magnetic layer is not hardened at the surface and in the vicinity of the surface by irradiation with electron beams in an atmosphere having an oxygen content of 10,000 ppm or more and, therefore, the smoothness of the surface of the magnetic layer is improved by the subsequent smoothening treatment, and the binder present in surface part is hardened only when it is irradiated with electron beams in an atmosphere containing oxygen at a concentration of 3,000 ppm or less.

DETAILED DESCRIPTION OF THE INVENTION

Examples of the compounds having unsaturated bonds polymerizable by irradiation with electron beams include those preferably having a plurality of vinyl or vinylidene carbon-carbon double bonds, more specifically compounds having acryloyl groups, acrylamido groups, allyl groups, vinyl ether groups, vinyl thioether groups, etc., and unsaturated polyesters.

Particularly preferred compounds are those having acryloyl groups or methacryloyl groups at both ends of their individual straight chain molecules, and they are cited in A. Vrancken, Fatipec Congress, 1119 (1972), U.S. Pat. No. 3,530,100, and British Pat. Nos. 1,234,684, 1,162,721, 1,162,722, 1,162,723 and 1,162,724. For example, such compounds are represented by the following structural formula:

etc.), and contains particles having a length of about 1.0 μm or shorter.

In a preferred embodiment, the magnetic coating compositions may contain monomers which have an unsaturated carbon-carbon bond in a molecule. Specific examples of such monomers include acrylic acid, methacrylic acid, itaconic acid, methyl acrylate and its analogues (i.e., acrylic acid alkyl esters), methyl methacrylate and its analogues (i.e., methacrylic acid alkyl esters), styrene and its congeners (i.e., α-methylstyrene, β-methylstryrene, etc.), acrylonitrile, methacrylonitrile, acrylamide, methacrylamide, vinyl acetate, vinyl propionate and so on. Also, monomers having two or more of unsaturated bonds may be added to the composition. Examples of such monomers include compounds described in Kankosei Jushi Data Shu (Collection of Data on Photosensitive Resins), pp. 235–236, K.K. Sogo Kagaku Kenkyusho (Dec. 1968), U.S. Pat. Nos. 2,760,863, 2,791,504 and 2,927,023, and British Pat. Nos. 834,733 and 854,980. In particular, unsaturated esters of polyols, such as ethylene diacrylate, diethylene glycol diacrylate, trimethylolmethane triacrylate, glycerol trimethacrylate, ethylene dimethacrylate, penatarythritol tetramethacrylate and the like, and glycidyl methacrylates having epoxy rings are preferably used. Particularly preferred monomers are diethylene glycol diacrylate, trimethylolmethane triacrylate and pentaerythritol tetramethacrylate. In addition, compounds having one unsaturated bond in a molecule and compounds having two or more unsaturated bonds in a molecule may be used in a mixture thereof.

Although solvents may not be used in the magnetic coating composition of this invention, it is preferred to use a solvent in an amount of about 100 to about 400% by weight based on the weight of the ferromagnetic powder. Examples of the solvent which can be used in the magnetic coating composition of this invention in-

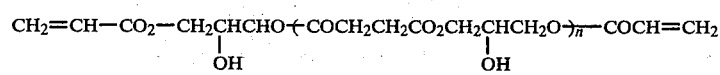

and the polyester skeleton of the above-illustrated compounds may be replaced by a polyurethane skeleton, an epoxy resin skeleton, a polyether skeleton, a polycarbonate skeleton or a combination of two or more of these skeletons. In addition, both ends of the above-illustrated compound may be methacryloyl group instead of acryloyl group. The molecular weight and the viscosity of these compounds are not critical in the present invention, but compounds having a viscosity of 1 to 1,000,000 cps at 50° C. and a molecular weight in the range of from 1,000 to 20,000, preferably 2,000 to 15,000, can be preferably used.

Examples of ferromagnetic powders which can be used in this invention include ferromagnetic iron oxide powder, ferromagnetic chromium dioxide powder, ferromagnetic alloy powder and so on. The ferromagnetic iron oxide and ferromagnetic chromium dioxide particles which can be used in this invention have an axial ratio ranging from about 2:1 to about 20:1, preferably 5:1 or more, and an average length in the range of about 0.2 to about 2.0 μm. The above-described ferromagnetic alloy powder is one which contains about 75 wt% or more of metal component, with 80 wt% or more of the metal component being one or more ferromagnetic metals (e.g., fe, Co, Ni, Fe-Co, Fe-Ni, Co-Ni, Fe-Co-Ni, clude ketones such as acetone, methyl ethyl ketone, methyl isobutyl ketone, cyclohexanone, etc.; esters such as methyl acetate, ethyl acetate, butyl acetate, ethyl lactate, glycol acetate monoethyl ether, etc.; ethers such as ethyl ether, glycol dimethyl ether, glycol monoethyl ether, dioxane, etc.; aromatic hydrocarbons such as benzene, toluene, xylene, etc.; chlorinated hydrocarbons such as methylene chloride, ethylene chloride, carbon tetrachloride, chloroform, ethylene chlorohydrin, dichlorobenzene, etc.; and the like.

In the magnetic coating composition of this invention, a suitable weight ratio of the polymer (based on the total weight of the polymer and the monomer when the monomer is used in combination) to the ferromagnetic powder ranges from 2:1 to 1:20, preferably from 1:1 to 1:10, and more preferably 1:3 to 1:8. Such weight ratio does not generally vary with the types of polymer/monomer and ferromagnetic powder used. The ratio outside the above-described broadest range sometimes results in poor electric characteristics or abrasion resistance of the resulting magnetic recording materials.

When the monomer is used, a preferred weight ratio of the polymer to the monomer is about 2/8 or above, more preferably the polymer/monomer ratio of 1/1 to 10/1. When the monomer is used in an amount of more than 80% by weight of the total polymer/monomer composition, a large amount of energy is required for hardening the coating composition.

In addition to the above-described components, a lubricant, a dispersing agent, an abrasive, a rust preventive agent, an antistatic agent and the like may be included as additives. Suitable examples of the lubricant include saturated and unsaturated higher fatty acids, fatty acid esters, higher fatty acid amides, higher alcohols, silicone oil, mineral oil, vegetable oil, fluorine compounds and the like. Such lubricants may be added at the time of preparing the coating composition. Also, before or after the smoothening processing, or after the second step of hardening by electron beam irradiation, the lubricant or a solution thereof dissolved in an organic solvent may be coated on or sprayed onto the surface of a magnetic layer.

In preparing a magnetic coating composition, the ferromagnetic powder and the individual components described above are charged into a kneader all at once or in sequence. In this process, the dispersing agent may be added together with the ferromagnetic powder.

In kneading and dispersing the magnetic coating composition, various types of kneaders can be used. For example, a two-rod roll mill, a three-rod roll mill, a ball mill, a pebble mill, a trommel, a sand grinder, a Szegvari attritor, a high speed impeller dispersing machine, a high speed stone mill, a high speed impact mill, a disperser, a kneader, a high speed mixer, a homogenizer, an ultrasonic wave dispersing machine, etc., can be used. Preferred types of kneaders are a two-rod roll mill, a three-rod roll mill, a sand grinder, a kneader and a high speed impeller.

Kneading and dispersing techniques are described in T. C. Patton, Paint Flow and Pigment Dispersion, John Wiley and Sons, New York (1964) and in U.S. Pat. Nos. 2,581,414 and 2,855,156.

A process for coating the above-described magnetic coating composition as a layer on a support can be performed by an air doctor coating process, a blade coating process, an air knife coating process, a squeeze-coating process, an immerse-coating process, a reverse roll coating process, a transfer roll coating process, a gravure coating process, a kiss coating process, a cast coating process, a spray coating process, a spin coating process and the like, but other suitable processes which are known to the art can also be employed. Specific detailed descriptions of suitable coating techniques are given in Coating Engineering, pp. 253–277, Asakura Shoten, Tokyo (Mar. 20, 1971). Preferred coating processes are a blade coating process, an air knife coating process, a reverse roll coating process and a spray coating process.

The magnetic coating composition is coated as a layer having a dry thickness of about 0.5 to about 15 $\mu$m. The dry thickness is properly determined depending upon the end-use purpose, the form and the standard of the magnetic material to be produced.

The magnetic layer coated on a support according to one of the above-described processes, is, if necessary, subjected to orientation of the ferromagnetic powder in the layer as described below in detail and the thus formed magnetic layer is then dried.

Orientation of the ferromagnetic powder in the magnetic layer can be carried out under the following conditions: The magnetic field for the orientation of the ferromagnetic powder can be about 500 to about 2,000 oersted (either a DC or an AC magnetic field). The direction of orienting the ferromagnetic powder is determined by what purpose it is used for. That is, for audio tapes, small-sized video tapes, memory tapes and the like, the orientation direction is parallel to the longitudinal direction of the tape, whereas in the case of video tapes for broadcasting, the orientation is inclined at an angle of 30° to 90° with respect to the longitudinal direction of the tape. The orientation of ferromagnetic powder can be achieved by the well known method as disclosed in U.S. Pat. Nos. 1,949,840, 2,796,359, 3,001,891, 3,172,776, 3,416,949, 3,473,960 and 3,681,138.

After the orientation, the magnetic layer is then air-dried. A suitable drying temperature for the magnetic layer is about 50° to about 120° C., preferably 70° to 100° C., more preferably 80° to 90° C., at an air flow rate of about 1 to about 5 kl/m$^2$, preferably 2 to 3 kl/m$^2$, with a drying time of about 30 seconds to about 10 minutes, preferably 1 to 5 minutes.

The treatment of smoothening the surface of the magnetic layer may be carried out before drying. The smoothening process before drying can be performed using a magnet smoother, a smoothening coil, a smoothening blade, a smoothening blanket, etc., as the case may be.

Suitable materials which can be used for the above support include polyesters such as polyethylene terephthalate, polyethylene 2,6-naphthalate, etc.; polyolefins such as polyethylene, polypropylene, etc.; cellulose derivatives such as cellulose triacetate, cellulose diacetate, cellulose acetate butyrate, cellulose acetate propionate, etc.; vinyl resins such as polyvinyl chloride, polyvinylidene chloride, etc.; other plastic materials such as polycarbonate, polyimide, polyamideimide, etc.; and further, according to the end-use purposes of the magnetic recording materials, non-magnetic metals such as Al, Cu, Sn, Zn, non-magnetic alloys containing these metals, etc.; and papers such as paper, baryta paper, papers on which $\alpha$-polyolefins having 2 to 10 carbon atoms such as polyethylene, polypropylene, ethylene-butene copolymer and the like, have been coated or laminated, etc. Particularly preferred examples of supports are polyethylene terephthalate and polyethylene 2,6-naphthalate. These non-magnetic supports may be transparent or opaque depending on the end-use purpose of the magnetic material.

The non-magnetic support can be in any form, e.g., a film, a tape, a sheet, a disc, a card, a drum, etc., and various materials are appropriately selected depending on the form employed as occasion calls.

The thickness of these non-magnetic support is about 1 to about 50 $\mu$m, preferably 2 to 25 $\mu$m, in the form of film, tape or sheet. When the support is in the form of disc or card, the thickness is about 0.5 to 2 mm, and when the support is in the form of drum, it is rendered cylindrical, the form of which is determined by the recorder to be used.

On the side opposite to the magnetic layer, the support may be back-coated (i.e., coated with a backing layer) for the purposes of preventing generation of static charges, transfer or wow and flutter, improving upon mechanical strength of the magnetic material, matting the back face of the magnetic material, etc.

The treatment for smoothening the surface of the magnetic layer after drying is conducted using a calendering process comprising passing the magnetic recording material between a plurality of specular rolls, or a calendering process comprising passing between a specular roll and an elastic roll. It should be noted that the magnetic layer after drying may contain a small amount of the remaining solvent and the presence of such small amount of solvent does not adversely affect the smoothening treatment.

A suitable specular roll which can be used for the calendering process is a metal roll, and a suitable elastic roll for such a purpose is a cotton roll or a synthetic resin (e.g., nylon, polyurethane, etc.) roll.

Preferable conditions for the calendering process are a pressure of about 25 to 100 kg/cm$^2$ or a linear pressure of 80 to 320 kg/cm, a temperature of about 10° to 150° C., more preferably 10° to 100° C., most preferably 10° to 70° C., a processing rate of 5 to 200 m/min and a processing step number of 1 to 30. If the temperature and the pressure exceed the upper limits set forth above, the magnetic layer and the support are detrimentally influenced, for example, the magnetic layer is peeled off, and the support is deformed. If the processing rate is less than about 5 m/min, a sufficiently surface-smoothening effect cannot be obtained, whereas if the rate is more than about 200 m/min, processing procedures become difficult.

These smoothening treatments are described in U.S. Pat. Nos. 2,688,567, 2,998,325 and 3,783,023 (incorporated herein by reference to disclose such treatments), German Patent Application (OLS) No. 2,405,222, Japanese Patent Application (OPI) Nos. 53631/74, 10337/75, 99506/75, 92606/76, 102049/75 and 103404/76, Japanese Patent Publication No. 17404/77, etc.

The smoothening treatment using specular rolls in the method of this invention is carried out after removing completely or partially the organic solvent from the coated layer provided on the support. That is, the coated layer is allowed to stand for an arbitrary time or dried under an atmospheric condition to remove all or some portion of the organic solvent therefrom and then subjected to the smoothening treatment.

Suitable examples of electron beam accelerators which can be used in this invention include those of the Van de Graaff type scanning system, double scanning system and curtain beam system.

Desirable electron beam characteristics can be obtained at an accelerating voltage of 100 to 1,000 kv, more preferably 150 to 700 kv. At an accelerating voltage of less than 100 kv, the energy of the electron beam is too low to permeate into the magnetic layer, whereas at an accelerating energy exceeding 1,000 kv, the efficiency of the energy to be employed for polymerization is decreased, that is to say, economical efficiency is lowered. A suitable absorption dose is 0.1 to 20 megarad, more preferably 0.1 to 10 megarad and, in most cases, 3 to 10 megarad, in both the first and the second steps of irradiation processings. Generally, the dose does not vary widely with the type of the polymer used. When the absorption dose is below 0.1 megarad, the hardening reaction is incomplete and sufficient strength cannot be imparted to the magnetic layer, whereas when the absorption dose is above 20 megarad, the efficiency of energy to be employed for hardening is lowered, and an exothermic reaction occurs in the irradiated material thereby resulting in the deformation of the support, especially plastic supports.

This invention will now be illustrated in greater detail by reference to the following examples and comparative examples.

However, this invention should not be construed as being limited to the following examples. In these examples, all parts are by weight unless otherwise indicated.

EXAMPLE 1

| Magnetic Coating Composition: | |
|---|---|
| $\gamma$-Fe$_2$O$_3$ | 100 parts |
| Urethane Type Acrylate Olygomer (synthesized in the same manner as described in Example 1 of U.S. Pat. No. 4,092,173, incorporated herein by reference) | 10 parts |
| Diethylene Glycol Diacrylate | 5 parts |
| Nitrocellulose (viscosity: RS ½H) | 10 parts |
| Ester Type Polyurethane (molecular weight: about 30,000) | 5 parts |
| Myristic Acid | 1 part |
| Butyl Stearate | 1 part |
| Methyl Ethyl Ketone | 300 parts |

The above-described composition was charged into a ball mill and kneaded for 50 hours. The thus obtained magnetic coating composition was coated on a 20 μm-thick polyethylene terephthalate film in a dry thickness of 8 μm using a doctor blade, oriented using a cobalt magnet, and dried to remove the solvent therefrom (for 1 minute at 100° C.). Then, the resulting magnetic recording material was irradiated with electron beams under the conditions that an accelerating voltage was 150 kv, an absorption dose was 1 megarad, and in an atmosphere containing oxygen at a concentration of 15,000 ppm. Thereafter, the magnetic recording material was subjected to the smoothening treatment using a 5-step calender comprising cotton rolls and specular rolls (with a roll temperature of 60° C. under a pressure of 100 kg/cm$^2$).

Then, the resulting material was irradiated with electron beams accelerated by the application of a voltage of 150 kg to an absorption dose of 2 megarad in an atmosphere containing oxygen at a concentration of 500 ppm. The thus obtained sample is referred to as Sample No. 1.

COMPARATIVE EXAMPLE 1

Sample No. 2 was prepared in the same manner as described in Example 1 except that the electron beam irradiation in the first step was carried out under an atmosphere containing oxygen at a concentration of 500 ppm.

COMPARATIVE EXAMPLE 2

Sample No. 3 was prepared in the same manner as described in Example 1 except that the first step irradiation was carried out under an atmosphere containing oxygen at a concentration of 500 ppm under an acceleration voltage of 150 kv so as to have an absorption dose of 3 megarad, and the second step irradiation for the smoothening treatment was not conducted.

COMPARATIVE EXAMPLE 3

Sample No. 4 was prepared in the same manner as described in Comparative Example 1 except that the smoothening treatment was not conducted.

EXAMPLE 2

Sample No. 5 was prepared in the same manner as described in Example 1 except that the following magnetic coating composition was employed instead of the coating composition of Example 1.

| Magnetic Coating Composition | |
|---|---|
| γ-Fe$_2$O$_3$ | 100 parts |
| Ester Type Acrylate Olygomer (Aronix M6100 produced by Toa Gosei Chemical Industry Co., Ltd.) | 10 parts |
| Diethylene Glycol Diacrylate | 5 parts |
| Nitrocellulose (viscosity RS ½H) | 7.5 parts |
| Ester Type Polyurethane (molecular weight: 30,000) | 7.5 parts |
| Myristic Acid | 1 part |
| Butyl Stearate | 1 part |
| Methyl Ethyl Ketone | 300 parts |

The resulting Samples Nos. 1 to 5 were then tested by the procedure as described below and the results obtained are summarized in Table 1.

TABLE 1

| Sample No. | Color Signal S/N (dB) | Still Durability |
|---|---|---|
| 1 (Present Invention) | +4 dB | 60 min or more |
| 2 (Comparative) | +2 dB | 30 min |
| 3 (Comparative) | 0 dB | 10 sec |
| 4 (Comparative) | Not determined due to peel off of magnetic layer | 1 sec or less |
| 5 (Present Invention) | +4 dB | 60 min or more |

Method for Measuring Still Durability

The data was obtained by recording a given video signal on separate video tapes (for each sample) using a video tape recorder of VHS type (model HR 3600, made by Victor Company of Japan, Limited), reproducing the still image, and measuring the time at which the still image lost its clearness (at 23° C., 65% RH).

While the invention has been described in detail and with reference to specific embodiments thereof, it will be apparent to one skilled in the art that various changes and modifications can be made therein without departing from the spirit and scope thereof.

What is claimed is:

1. A process for producing a magnetic recording material comprising the steps of:
coating on a support a composition containing a compound having an unsaturated bond polymerizable by irradiation with electron beams, an organic solvent capable of dissolving said compound, and a ferromagnetic powder;
irradiating the coated composition with electron beams in an atmosphere containing oxygen at a concentration of at least 10,000 ppm;
subjecting the surface of the resulting composition to a smoothening treatment utilizing a specular surface; and
irradiating the smoothened surface with electron beams in an atmosphere containing oxygen at a concentration of 3,000 ppm or less.

2. The process for producing the magnetic recording material as claimed in claim 1, wherein the first electron beam irradiation is conducted at an accelerating voltage in the range of 100 to 1,000 kv and at an absorption dose of 0.1 to 10 megarad.

3. The process for producing the magnetic recording material as claimed in claim 1, wherein said smoothening treatment utilizing a specular surface is carried out using a 1- to 30-step calender comprising specular rolls and elastic rolls under a pressure of 25 to 100 kg/cm$^2$ at a calendering temperature of 10° to 100° C.

4. The process for producing the magnetic recording material as claimed in claim 1, wherein the second electron beam irradiation is conducted at an accelerating voltage in the range of 100 to 1,000 kv and at an absorption dose of 0.1 to 10 megarad.

5. The process for producing the magnetic recording material as claimed in claim 1, wherein the compound having an unsaturated bond polymerizable by irradiation with electron beams is a polymer having a molecular weight within the range of 1,000 to 20,000.

6. The process for producing the magnetic recording material as claimed in claim 1, wherein the ferromagnetic powder is comprised of ferromagnetic particles having an axial ratio ranging from about 2:1 to about 20:1 and having an average length of about 0.2 to about 2.0 μm.

7. The process for producing the magnetic recording material as claimed in claim 1, wherein the weight ratio of the compound having an unsaturated bond to the ferromagnetic powder ranges from 1:1 to 1:10.

8. The process for producing the magnetic recording material as claimed in claim 1, wherein the coated composition has a thickness within the range of 0.5 to about 15 μm.

9. The process for producing the magnetic recording material as claimed in claim 1, wherein the support is in the form of a film, tape or sheet and has a thickness within the range of 2 to 25 μm.

10. The process for producing the magnetic recording material as claimed in claim 4, wherein the accelerating voltage is in the range of 150 to 700 kv.

* * * * *